(Model.)

2 Sheets—Sheet 1.

J. W. JONES.
MACHINE FOR CUTTING GREEN CORN FROM THE COB.

No. 251,342.    Patented Dec. 20, 1881.

Witnesses:
Fred. G. Dieterich
George Binkenburg

Inventor
John W. Jones
By Daniel Breed
Atty.

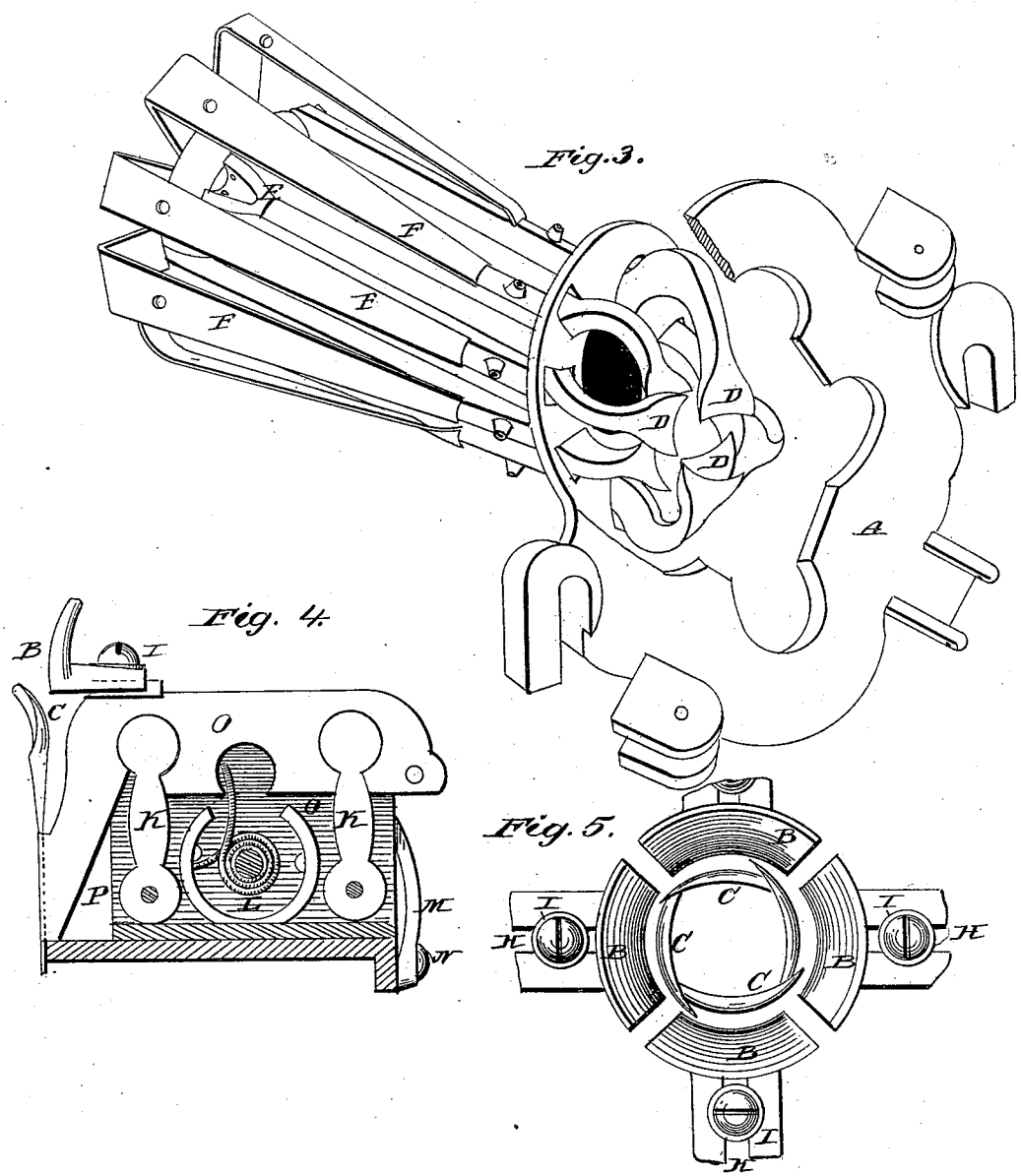

UNITED STATES PATENT OFFICE.

JOHN WINSLOW JONES, OF DEERING, MAINE.

MACHINE FOR CUTTING GREEN CORN FROM THE COB.

SPECIFICATION forming part of Letters Patent No. 251,342, dated December 20, 1881.

Application filed September 13, 1878. Renewed July 29, 1881. (Model.)

*To all whom it may concern:*

Be it known that I, JOHN WINSLOW JONES, of Deering, Cumberland county, State of Maine, have invented a Machine for Cutting Green Corn from the Cob; and I do hereby declare the following to be a full and correct description of the same, reference being had to the accompanying drawings, in which—

Figure 1:
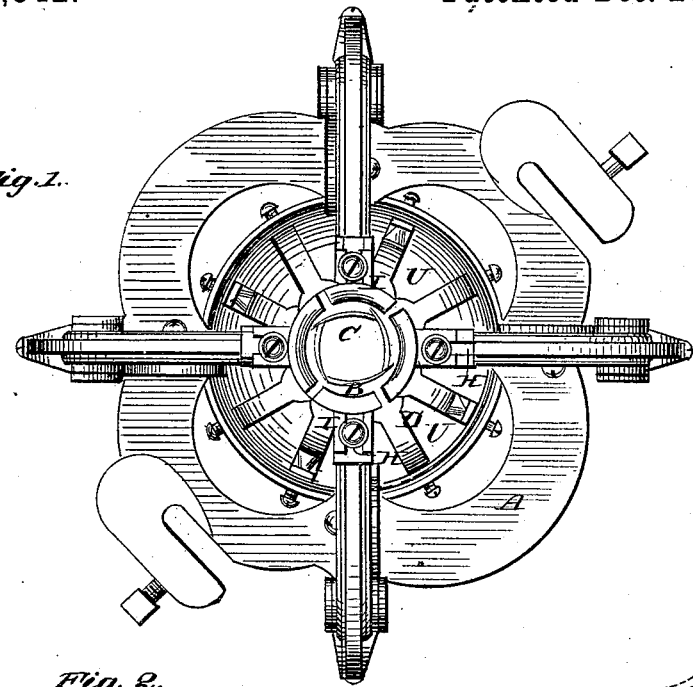
Figure 2:
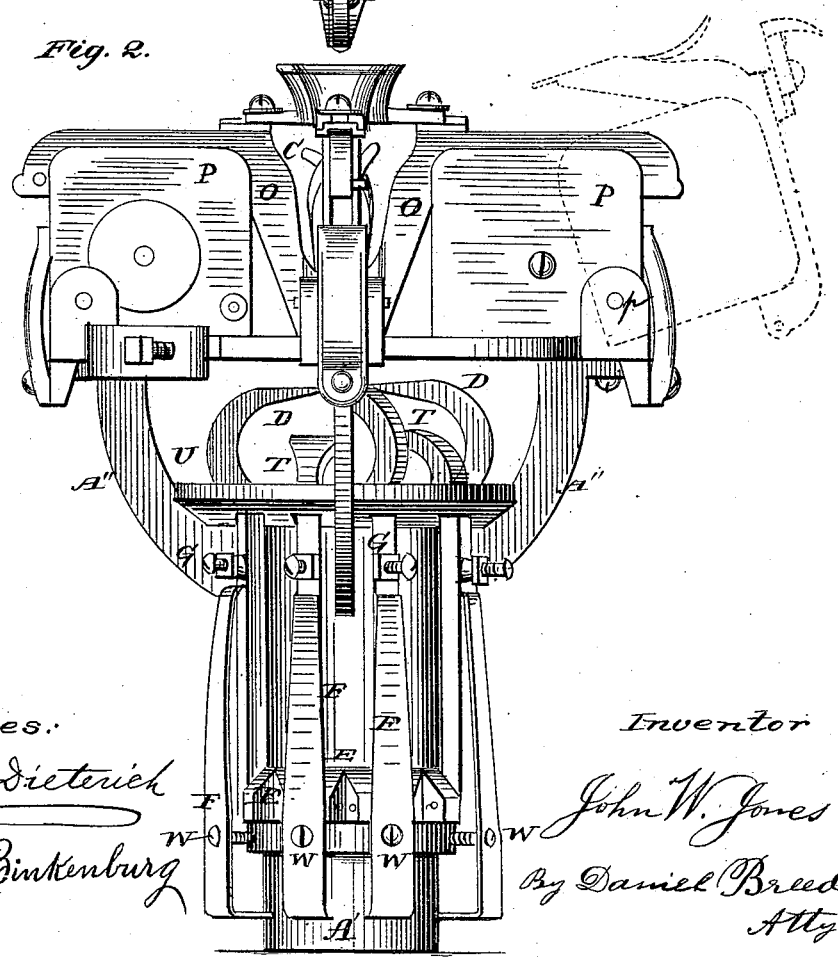

Figure 1 is a direct view of the cutter-head, showing the circle or series of knives and spring-guides gaged thereto and other parts, all detached from the general machine, which is not here claimed. Fig. 2 is a lateral view of Fig. 1. Fig. 3 is a perspective, better showing the form of the cob-scrapers, also seen in Figs. 1 and 2. Fig. 4 shows the interior of the chamber containing the spring and other parts for working the adjustable slide, guides, and knives. Fig. 5 is a view representing the knives and a circle of spring-guides nearly of full size.

These drawings represent only the cutter-head detached from the general machine, which contains the feeding devices and means for forcing the ear of corn into this cutter-head.

The chief features of my present improvement are in the novel construction and arrangement of the tube having a flange thereon provided with radial slots, the series of pairs of yielding scrapers having their shanks extending along the side of said tube and their adjusting devices, all as will be hereinafter fully described, and specifically designated in the claims.

In the drawings, A' represents a cast-iron tube made very long and provided with the irregular rim A and radial arms A'': On this rim A are mounted a series of slides, O, Fig. 4, carrying the circle of knives C and guiding-jaws B, which form the mouth into which the ear of corn is forced for cutting of the kernels by means of the knives C, before mentioned. These slides O ride upon the swinging arms K K, thus affording a horizontal motion to the slides almost without friction. As these slides and swinging arms form the subject-matter of another application wherein they are claimed, further description is deemed unnecessary in the present case.

The tube A', which receives the cob when the kernels of corn are removed, serves as an attachment for the two sets of scrapers D and T, one set being placed above the other, as seen in Fig. 2. This tubular guide A' has a collar, U, cast in the same piece, and having radial slots to guide the scrapers D and T as they play forward and backward to adapt themselves to the size of the cob. These scrapers have long shanks, the lower ends of which are pivoted to lugs or ears E on the lower end of the tube A'. A set of strong plate-springs, F, press the scrapers D and T forward upon the cob, and the tension of these springs may be increased or diminished by the adjusting-screws W, Fig. 2. The two sets or circles of scrapers D and T are also provided with set-screws G, for adjusting them to the size of the cob, and thereby adapting the machine to work on smaller or larger ears of corn, as may be desired.

I am aware that scrapers connected to yielding and adjustable arms are old, and such I do not wish to be understood as claiming, broadly, as of my invention.

Having described my invention, I claim—

In a machine for removing green corn from the cob, the combination, with the tube A', provided with the pivoted scrapers and the springs F, of the set-screws W, for regulating the tension of said springs, and the set-screws for limiting the movement of said scrapers, substantially as and for the purpose herein shown and described.

The above specification of my said invention signed and witnessed at Portland, Maine, this 7th day of September, A. D. 1878.

JOHN WINSLOW JONES.

Witnesses:
 D. A. MEAHER,
 WILLIAM K. NEAL.